US012756677B2

(12) United States Patent
Roozbeh et al.

(10) Patent No.: US 12,756,677 B2
(45) Date of Patent: Oct. 6, 2026

(54) PACKET PROCESSING INCLUDING AN INGRESS PACKET PART DISTRIBUTOR

(71) Applicant: Telefonaktiebolaget LM Ericsson (publ), Stockholm (SE)

(72) Inventors: Amir Roozbeh, Stockholm (SE); Alireza Farshin, Stockholm (SE); Marco Chiesa, Sollentuna (SE); Dejan Kostic, Solna (SE); Tom Francois G. Barbette, Liege (BE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 43 days.

(21) Appl. No.: 18/869,997

(22) PCT Filed: May 22, 2023

(86) PCT No.: PCT/EP2023/063619
§ 371 (c)(1),
(2) Date: Nov. 27, 2024

(87) PCT Pub. No.: WO2023/232536
PCT Pub. Date: Dec. 7, 2023

(65) Prior Publication Data

US 2025/0330433 A1 Oct. 23, 2025

Related U.S. Application Data

(60) Provisional application No. 63/365,498, filed on May 30, 2022.

(51) Int. Cl.
*H04L 49/90* (2022.01)
*H04L 49/65* (2022.01)

(52) U.S. Cl.
CPC .......... *H04L 49/9042* (2013.01); *H04L 49/65* (2013.01)

(58) Field of Classification Search
CPC ............................ H04L 49/65; H04L 49/9042
See application file for complete search history.

(56) References Cited

U.S. PATENT DOCUMENTS 4,755,986 A * 7/1988 Hirata ..................... H04L 49/90 370/392
6,453,360 B1 * 9/2002 Muller ................ H04L 47/2441 709/236

(Continued)

OTHER PUBLICATIONS

Lee, Jung-Bok, et al. "High-performance software load balancer for cloud-native architecture." Ieee Access 9: 123704-123716. (Year: 2021).*

(Continued)

*Primary Examiner* — John M Macilwinen
(74) *Attorney, Agent, or Firm* — FBT Gibbons LLP

(57) ABSTRACT

A network device may receive an ingress packet that includes a header and a payload, wherein the header includes data stored in a plurality of fields according to a predefined format. The network device may send different, potentially overlapping, parts of the ingress packet concurrently for independent processing by different ones of a plurality of accelerators to produce results. The network device may forward, based on the results generated by the different ones of the plurality of accelerators, an egress packet out of the network device, wherein a payload of the egress packet is based on the contents of the payload of the ingress packet.

17 Claims, 10 Drawing Sheets

(56) References Cited

U.S. PATENT DOCUMENTS

| | | | | |
|---|---|---|---|---|
| 2004/0057434 | A1* | 3/2004 | Poon | H04L 12/56<br>370/392 |
| 2005/0278502 | A1* | 12/2005 | Hundley | G06F 9/4843<br>712/34 |
| 2010/0074259 | A1* | 3/2010 | Tse-Au | H04L 49/9042<br>370/392 |
| 2010/0177789 | A1* | 7/2010 | Chen | H04L 63/20<br>370/477 |
| 2019/0013965 | A1* | 1/2019 | Sindhu | H04L 49/10 |
| 2020/0314219 | A1* | 10/2020 | Watson | H04L 49/3063 |
| 2023/0246931 | A1* | 8/2023 | Chang | H04L 43/06<br>709/212 |

OTHER PUBLICATIONS

Schelten, Niklas, et al. "A high-throughput, resource-efficient implementation of the RoCEv2 remote DMA protocol for network-attached hardware accelerators." 2020 International Conference on Field-Programmable Technology (ICFPT). IEEE. (Year: 2020).*

* cited by examiner

PACKET PROCESSING INCLUDING AN INGRESS PACKET PART DISTRIBUTOR

CROSS-REFERENCE TO RELATED APPLICATIONS

This application is a national-phase entry under 35 USC § 371 of International Application PCT/EP2023/063619, filed May 22, 2023, titled "PACKET PROCESSING INCLUDING AN INGRESS PACKET PART DISTRIBUTOR," which claims the benefit of and priority to U.S. Provisional Application No. 63/365,498, filed May 30, 2022, and entitled, "PACKET PROCESSING INCLUDING AN INGRESS PACKET PART DISTRIBUTOR"; the entire contents of both are incorporated herein by reference in their entireties for all purposes.

TECHNICAL FIELD

Embodiments of the invention relate to the field of packet processing; and more specifically, to the separating of packets into parts.

BACKGROUND ART

Introducing faster link speeds and the need for having low-latency Internet services has made packet processing (i.e., an essential element for data centers and telecom traffic) more challenging due to limitations imposed on commodity hardware by the slowdown of Moore's law and the demise of Dennard scaling. To address these limitations, networking equipment has been going through some fundamental changes to become more programmable & flexible to accelerate packet processing and reduce the pressure from commodity hardware. We have seen the development of OpenFlow-enabled switches, programmable (P4-enabled) switches, smart NICs, and programmable (FPGA) NICs throughout the last decade. This equipment offers system developers more programmability and offloading capabilities, enabling them to accelerate/perform packet processing at earlier stages in different parts of the network. However, the newly introduced hardware also comes with limitations that make them unsuitable for processing all kinds of functions/operations. For instance, programmable (P4-enabled) switches have limited ALU operations (e.g., no division, no modulo, and no floating-point operations) and a limited amount of high-bandwidth readable/writable memory, preventing them to perform sophisticated network functions requiring a large amount of memory and/or per-flow states. These limitations make each hardware/accelerator suitable for a specific set of packet processing, which requires a tailored and architecture-aware scheduler for packet processing to be able to benefit from their processing power.

The need for flexibility, faster time to market, and lower deployment costs are factors driving the trend towards Network Function Virtualization (NFV), where network functions are realized on commodity hardware (e.g., CPU-based servers) as opposed to specialized and proprietary hardware. Real-world Internet services typically require each packet to be processed by multiple network functions, such as load balancer (LB), NAT, firewall, deep packet inspection (DPI), and router. There are two common ways to process packets on CPU-based commodity hardware:

In the run-to-completion, each CPU core runs the whole chain of network functions, i.e., the traffic can be processed by each core independently. As long as we are able to efficiently balance the load among the CPU cores, this model can achieve good performance due to minimal inter-core communication and high instruction/data locality. Moreover, this model uses the available resources more efficiently, as each resource (i.e., each CPU core) can be used separately.

In the pipeline model, each CPU core only runs one or a set of the whole chain of network functions. Consequently, the packets should be passed to different cores in order to be fully processed. This model may achieve low latency, as long as the first function does not become a bottleneck in terms of computation power or I/O, where the packets start being dropped. This model can be beneficial for network functions with a high memory footprint, but it fails to use the available resources efficiently, as each CPU core has to receive its workload from other CPU cores. See here: https://ieeexplore.ieee.org/document/9481797

Most of the network functions benefit from the run-to-completion model, but some configurations may achieve higher performance with the pipeline model, as some workloads may not fit in one CPU core cache. Neither of these ways performs simultaneous processing on the same packet.

SUMMARY

In some aspects, the techniques described herein relate to a method in a network device. The method includes receiving, at the network device, an ingress packet that includes a header and a payload, where the header includes data stored in a plurality of fields according to a predefined format. In addition, the method includes sending different, potentially overlapping, parts of the ingress packet concurrently for independent processing by different ones of a plurality of accelerators to produce results. Also, the method includes forwarding, based on the results generated by the different ones of the plurality of accelerators, an egress packet out of the network device, where a payload of the egress packet is based on the contents of the payload of the ingress packet.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
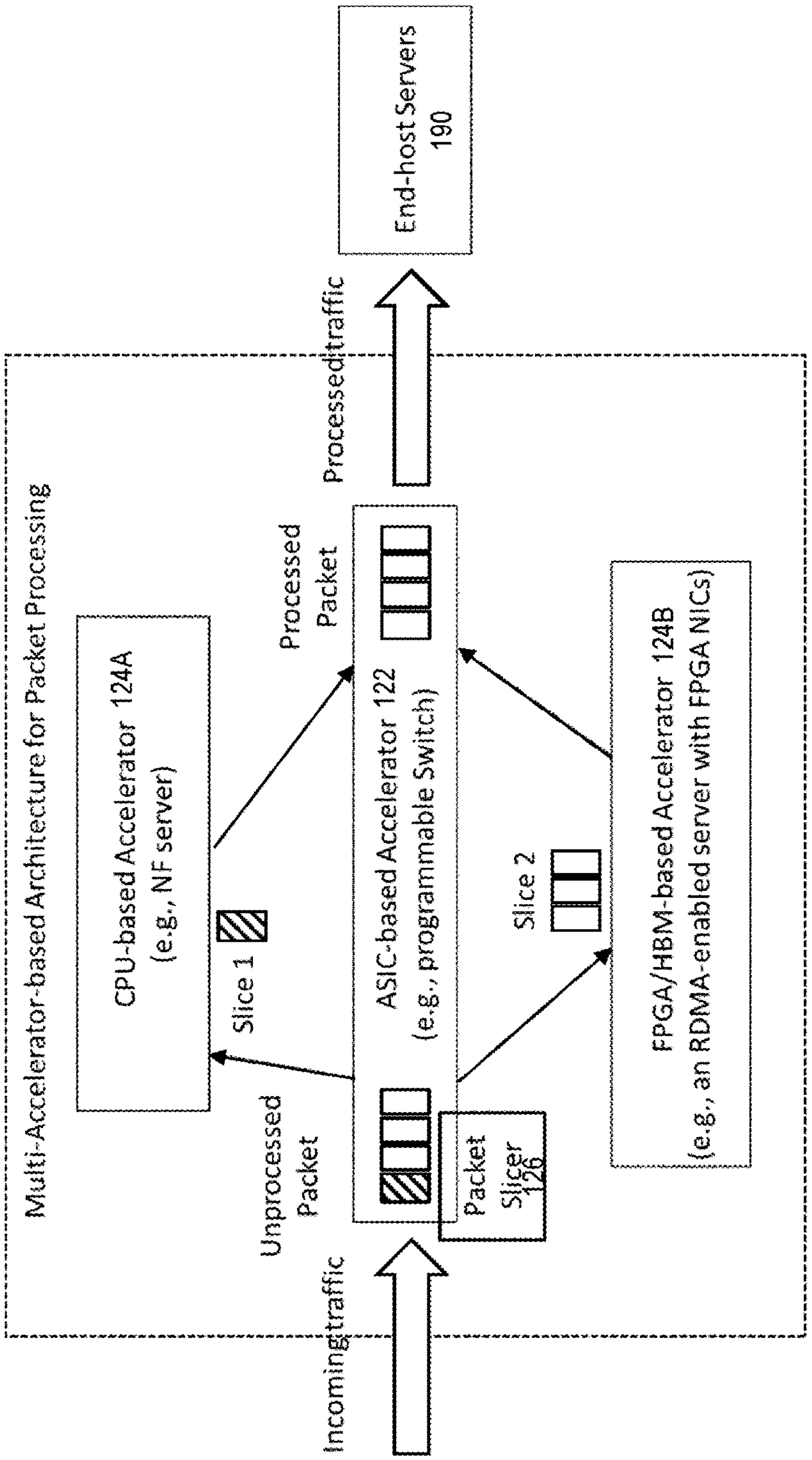
FIG. 1 shows a sample multi-accelerator-based architecture for packet processing, where unprocessed traffic is received at an ASIC-based accelerator; then different slices of the received packets are sent to relevant accelerators for further processing; and finally merged as a packet on the ASIC-based accelerator.

The following description describes methods and apparatus for packet processing including an ingress packet part distributor. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Some embodiments perform per-flow simultaneous packet processing on different parts (sometimes referred to as slices) of a packet in a multi-accelerator-based architecture with at least two types (e.g., CPU, ASIC, and FPGA/HBM) of packet processors and/or accelerators that are suitable for different kinds of processing.

In some embodiments, an ingress packet part distributor (sometime referred to as a packet slicer) is implemented on an accelerator (e.g., implemented on an ASIC, FPGA, CPU or a normal server; to, for example, coexist and run on a programmable switch). The ingress packet part distributor, in some embodiments, performs the following: 1) splits a packet into different, potentially overlapping, parts; 2) transmits those parts concurrently for independent processing (which may occur concurrently or simultaneously) by different ones of a plurality of accelerators to produce results. Based on the generated results, an egress packet controller forwards an egress packet. The combination of the ingress packet part distributor and the egress packet controller is referred to as the coordinator. While in some embodiments both the ingress packet part distributor and the egress packet controller are implemented on the same accelerator, in alternative embodiments they are implemented on different accelerators. The ingress packet part distributor, in some embodiments, also configures the different accelerators for the packet processing to be performed.

While some embodiments contemplate a disaggregated architecture for different accelerators (accelerators are in different boxes/devices/locations), alternative embodiments may have multiple or all of the accelerators in a single box/device and/or make use of unused storage on one or more servers (i.e., CPU-based accelerators that potentially may also be equipped with other accelerators such as FPGA).

Various exemplary ways in which the packet processing tasks may be performed. According to a first example, the ingress packet part distributor splits a packet and transmits the parts (including the payload) to other accelerators (which process the parts and store the resulting fields of the header on the front of the payload in storage accessible to the coordinator; this can be: (i) merging via RDMA, where slices will be directly sent to the right locations in the memory, and (ii) merging at the merging server/accelerator via processing the attached trailers to packet slices). The coordinator accesses the processed packet from storage. The egress packet controller forwards the packet to the next hop.

According to a second example, the ingress packet part distributor splits a packet, stores the payload via RDMA, and transmits one or more other parts to other accelerator(s) (which process the part(s) and store the resulting fields of the header on the front of the payload where it is already stored; this can be: (i) merging via RDMA, where slices will be directly sent to the right locations in the memory, and (ii) merging at the merging server/accelerator via processing the attached trailers to packet slices). The egress packet controller accesses the processed packet from storage and forwards the packet to the next hop.

According to a third example, the ingress packet part distributor splits a packet, stores the payload in a merging accelerator's memory (this can be: (i) via RDMA, or (ii) transmitting the payload with a trailer to instruct the merging accelerator), and transmits one or more other parts to other accelerator(s). The coordinator accesses the egress packet, which includes: 1) receiving the results of processing the parts (e.g., the header fields) from the other accelerators, 2) storing the processed parts (e.g., the header fields) on the front of the payload to make the egress packet (this can be: (i) merging via RDMA, where slices will be directly sent to the right locations in the memory of the merging accelerator, or (ii) merging at the merging server/accelerator via trailers attached to packet slices by the packet slicer), and 3) reading the resulting packet. The egress packet controller then forwards the packet to the next hop.

According to a fourth example, the ingress packet part distributor splits a packet, stores the payload via RDMA, and transmits one or more other parts to other accelerator(s). The coordinator accesses the egress packet, which includes: 1) receiving the results of processing the parts (e.g., the header fields) from the other accelerators, 2) reading the payload via RDMA; and 3) merging the results of processing the parts with the payload. The egress packet controller then forwards the packet to the next hop.

According to a fifth example, the ingress packet part distributor splits a packet, stores the payload internally in the coordinator, and transmits one or more other parts to other accelerator(s). The coordinator accesses the egress packet, which includes: 1) receiving the results of processing the parts (e.g., the header fields) from the other accelerators, and 2) storing the received internally with the payload to form an egress packet; and 3) merging the results of processing the parts with the payload. The egress packet controller then forwards the packet to the next hop.

In some embodiments, the ingress packet part distributor enables: (i) performing different processing tasks on different slices/parts of the packet simultaneously, (ii) realizing per-flow network functions that can handle hundreds of millions of connections (iii) scheduling packets in advanced manners, e.g., ordering packets of the same flow, and (iv) optionally creating jumbo frames to prevent unnecessary/excessive protocol processing.

Some embodiments additionally support the generation of jumbo frames. For at least some packets of at least one flow, a jumbo frame is constructed to reduce packet processing overheads at the next hop (which may be a downstream server) and use the available bandwidth more efficiently. Note that the jumbo frame construction can be done either on the Packet Slicer itself or on a separate accelerator. While in some embodiments the coordinator rebuilds the packet before transmitting the packet, in alternative embodiment the coordinator (in some embodiments, the, Packet Slicer) may provide hints/instructions to the next hop, or end-host servers, so that they can fetch/read/access different parts/slices of the packet(s) from different locations in a specific order (e.g., via remote direct memory access (RDMA)). This alternative can be useful in cases where preserving the order of parts slices at the end-host may be challenging (e.g., due to having multiple queues on the NICs).

Exemplary Architectures

FIG. 1 shows a sample multi-accelerator-based architecture for packet processing, where unprocessed traffic is received at an ASIC-based accelerator; then different slices of the received packets are sent to relevant accelerators for further processing; and finally merged as a packet on the ASIC-based accelerator.

One specific exemplary embodiment of FIG. 1, has the following:

1. The ASIC-based accelerator 122 (also referred to as the coordinator) has at least one external ingress ports to receive packets.
2. The ASIC-based accelerator has:
   a. At least one internal bidirectional port connecting it to the CPU-based accelerator 124A.
   b. At least one internal bidirectional port connecting it to at least one FPGA/HBM-based accelerator 124B.
3. The CPU-based accelerator 124A and the FPGA/HBM-based accelerator 124B send the processed parts back to the ASIC-based accelerator 122.
4. The ASIC-based accelerator 122 has at least one external egress port connecting it to at least one End-host Server 190.
5. Packet flow example:
   a. A packet is received through one of the external ingress port(s). FIG. 1 shows "Unprocessed Packet" having four boxes.
   b. The packet slicer 126 separates the packet into parts (e.g., a payload and a header, slices the header into different potentially overlapping parts, etc.).
   c. The different parts are sent (by an internal transmission component of the ASIC-based accelerator 122) out internal bidirectional ports to be received on internal bidirectional ports of the other accelerator(s)). FIG. 1 shows: 1) the first box going to CPU-based Accelerator 124A as slice 1; and 2) the second through fourth boxes going to FPGA/HBM-based accelerator 124B as slice 2.
   d. The other accelerators process the parts of the packets and send the processed parts out internal bidirectional ports to be received on the internal bidirectional port(s) of the ASIC-based accelerator 122.
   e. A merger component (e.g., of the ASIC-based accelerator 122) merges the processed header parts with the payload to form an egress packet. FIG. 1 shows "Processed Packet" with four boxes.
   f. The egress packet controller forwards the packet out one of the external egress ports to a next hop or one of the end-host server(s).

Figure 2:
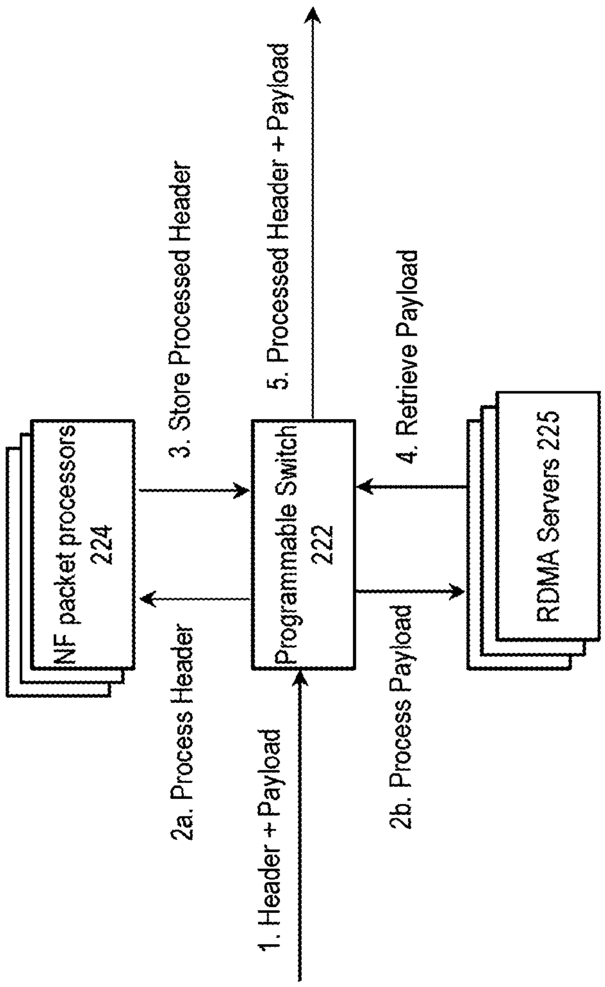
FIG. 2 shows another sample multi-accelerator-based architecture.

FIG. 2 shows another sample multi-accelerator-based architecture. In some embodiments of FIG. 2, dedicated external NF packet processors 224 process packet headers. The payloads are stored on shared general-purpose servers without any CPU intervention (i.e., using RDMA technology; shown as RDMA Servers 225); which, in some embodiments are or include the use of unused storage space of the end-host servers. This leverages the advanced capabilities of emerging high-speed programmable switches (shown as programmable switch 222) to receive packets, split them into headers and payloads, and reconstruct them after the NF packet processors 224 have updated their headers or reschedule their transmission. By only processing packet headers, such embodiments overcome the bandwidth bottleneck at the dedicated devices, which allows for the processing of significantly higher numbers of packets on the same dedicated machine. As all required data structures are handled by CPUs, embodiments can support relatively high numbers of modifications to these data structures.

While FIGS. 1 and 2 show traffic flowing in one direction, embodiments can support traffic flowing in the opposite direction as well (bidirectional traffic). FIGS. 1 and 2 assume that the arrowed lines reflect both communication of the parts of the packet and control/indications (which instruct the accelerators to perform operations and/or instruct the ASIC-based accelerator that the results of the accelerators are ready). However, these communications could be separated into: 1) the parts of the packet (e.g., sent through RDMA); and 2) the control/indications (a separate mechanism such as: (i) the Packet Slicer notifies the accelerator about the RDMA-ed slice(s) via control messages or (ii) the accelerator polls a data structure to get notified about the new incoming messages.

In some embodiments, a given packet can be recirculated into the same accelerator or it can be sent to a separate accelerator (similar to the pipeline packet processing model).

Figure 3:
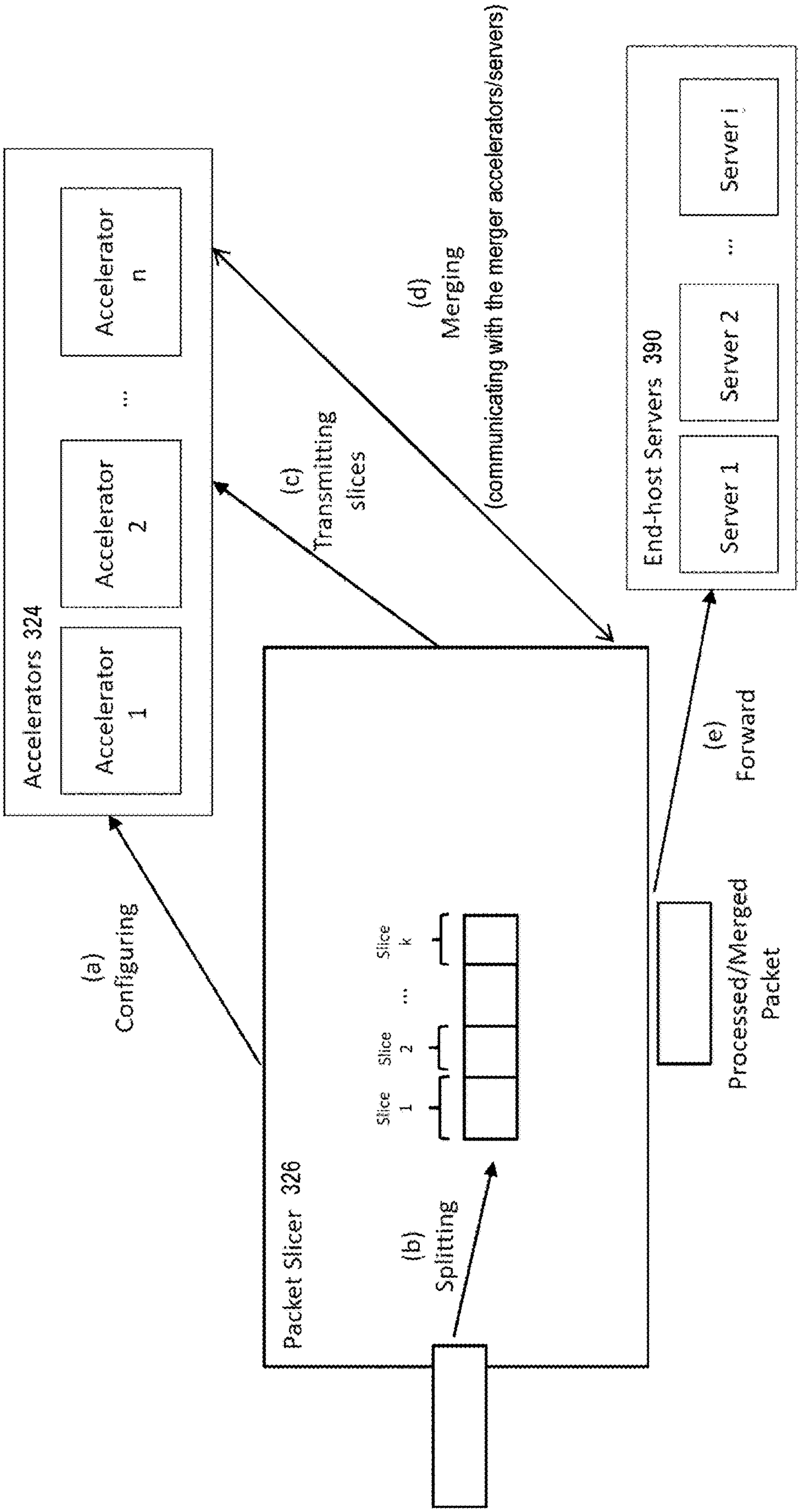
FIG. 3 shows a third sample multi-accelerator-based architecture.

FIG. 3 shows a third sample multi-accelerator-based architecture. FIG. 3 shows a pack a packet slicer 326, accelerators 324, and end-host servers 390. The accelerators 324 include accelerator 1 to accelerator n. The end-host servers include server 1 to server i. An arrowed line labeled (a) Configuring extends from the packet slicer 326 to the accelerators 324. An arrowed line labeled (b) Splitting extends from a box entering the packet slicer 326 to a box divided up into slices 1 to k. An arrowed line labeled (c) Transmitting slices extends from the packet slicer 326 to the accelerators 324. An arrowed line labeled (d) Merging extends from the accelerators 324 to the packet slicer 326 and indicates communicating with the merger accelerators/ servers. An arrowed line labeled (e) Forward extends from the packet slicer 326 to the end-host servers 390 and has adjacent to it a box labeled "Processed/Merged Packet."

Figure 4:
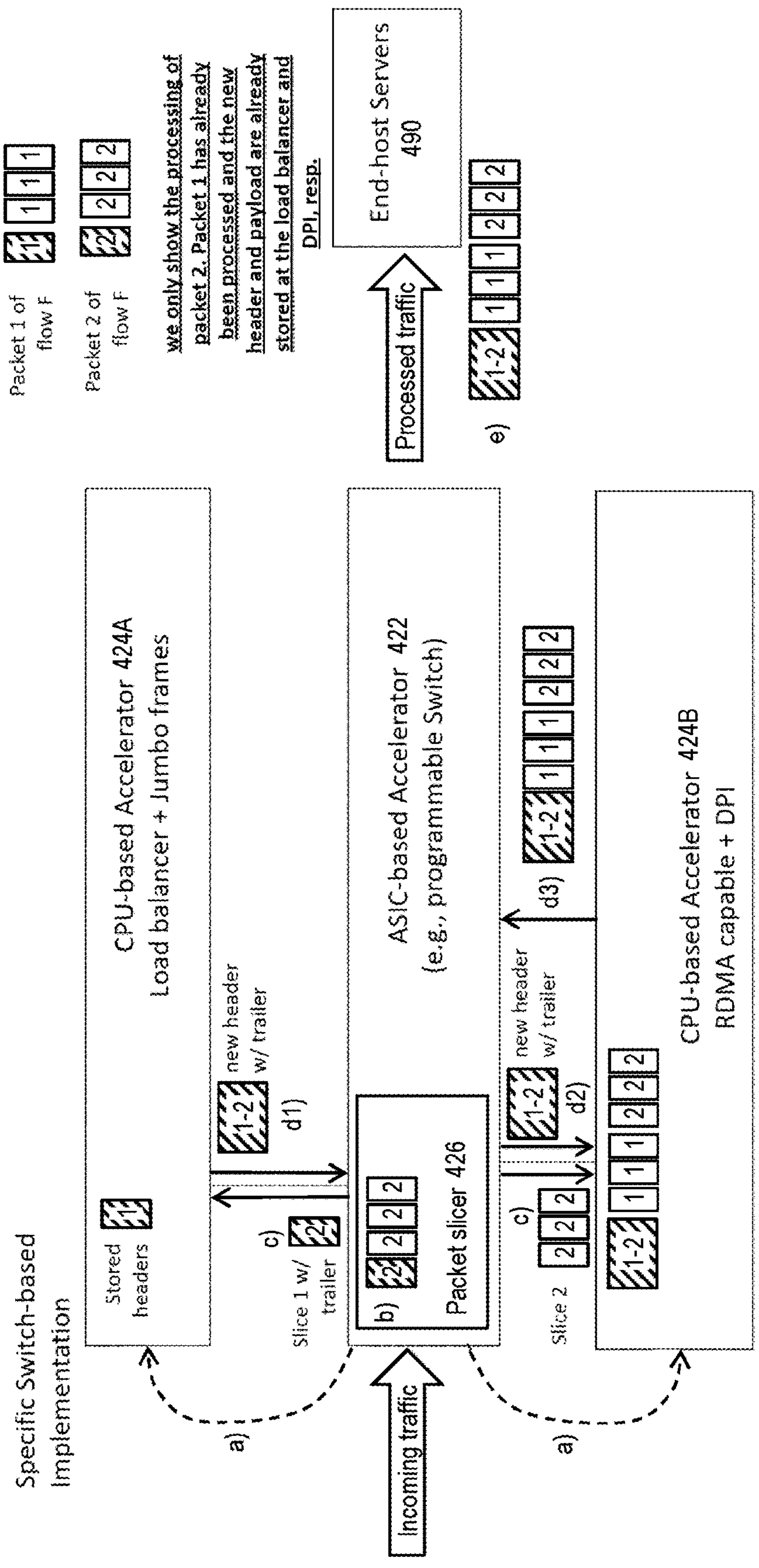
FIG. 4 shows the construction of a jumbo packet in the context of a sample multi-accelerator-based architecture.

FIG. 4 shows the construction of a jumbo packet in the context of a sample multi-accelerator-based architecture. FIG. 4 shows an ASIC-based accelerator 422 (e.g., programmable switch), a CPU-based Accelerator 424A, a CPU-based accelerator 424B, and end-host servers 490. The ASIC-based accelerator 422 includes a packet slicer 426, the CPU-based Accelerator 424A indicates Load balancer+ Jumbo frames, and the CPU-based accelerator 424B indicates RDMA capable+DPI. Dashed arrowed lines labeled a) extends from the ASIC-based accelerator 422 to the CPU-based Accelerator 424A and the CPU-based accelerator 424B. FIG. 4 also shows an arrowed line going to the ASIC-based accelerator 422 and labeled incoming traffic, as well as an arrowed line going from the ASIC-based accelerator 422 to the end-host servers 390 and labeled processed traffic.

Additionally, FIG. 4 shows packet 1 of flow F and packet 2 of flow F. Packet 1 and packet 2 each include a first box followed by 3 additional boxes. The boxes of Packet 1 all include a "1," while the boxes of packet 2 all include a "2."

In FIG. 4, packet 1 has already been processed and the new header and payload are already stored at the load balancer and DPI, respectively. The first box of packet 1 (which has a "1" therein) is shown in the CPU-based Accelerator 424A and labeled "stored headers."

At b), the boxes of packet 2 (all of which include a "2") are shown in packet slicer 426. An arrowed line, which is labeled "c) slice 1 w/trailer" and is next to packet 2's first box (which includes a "2"), extends from the ASIC-based accelerator 422 to the CPU-based Accelerator 424A. Also, an arrowed line, which is labeled "c) slice 2" and is next to packet 2's three additional boxes (all of which includes a "2"), extends from the ASIC-based accelerator 422 to the CPU-based accelerator 424B.

An arrowed line, which is labeled "d1) new header with trailer" and is next to a box with a "1-2" inside, extends from the CPU-based Accelerator 424A to the ASIC-based accelerator 422. An arrowed line, which is labeled "d2) new header with trailer" and is next to a box with a "1-2" inside, extends from the ASIC-based accelerator 422 to the CPU-based accelerator 424B.

The CPU-based accelerator 424B is shown including the box with "1-2" inside, followed by packet 1's three additional boxes (each with a "1" inside), followed by packet 2's three additional boxes (each with a "2" inside). An arrowed line, which is labeled "d3" and is next to a box with a "1-2" inside followed by packet 1's three additional box (each with a "1" inside) and followed by packet 2's three additional boxes (each with a "2" inside), extends from the CPU-based accelerator 424B to the ASIC-based accelerator 422. An arrowed line, which is labeled "e)" and is next to a box with a "1-2" inside followed by packet 1's three additional box (each with a "1" inside) and followed by packet 2's three additional boxes (each with a "2" inside), extends from the ASIC-based accelerator 422 to the end-host servers 490.

Figure 5A:
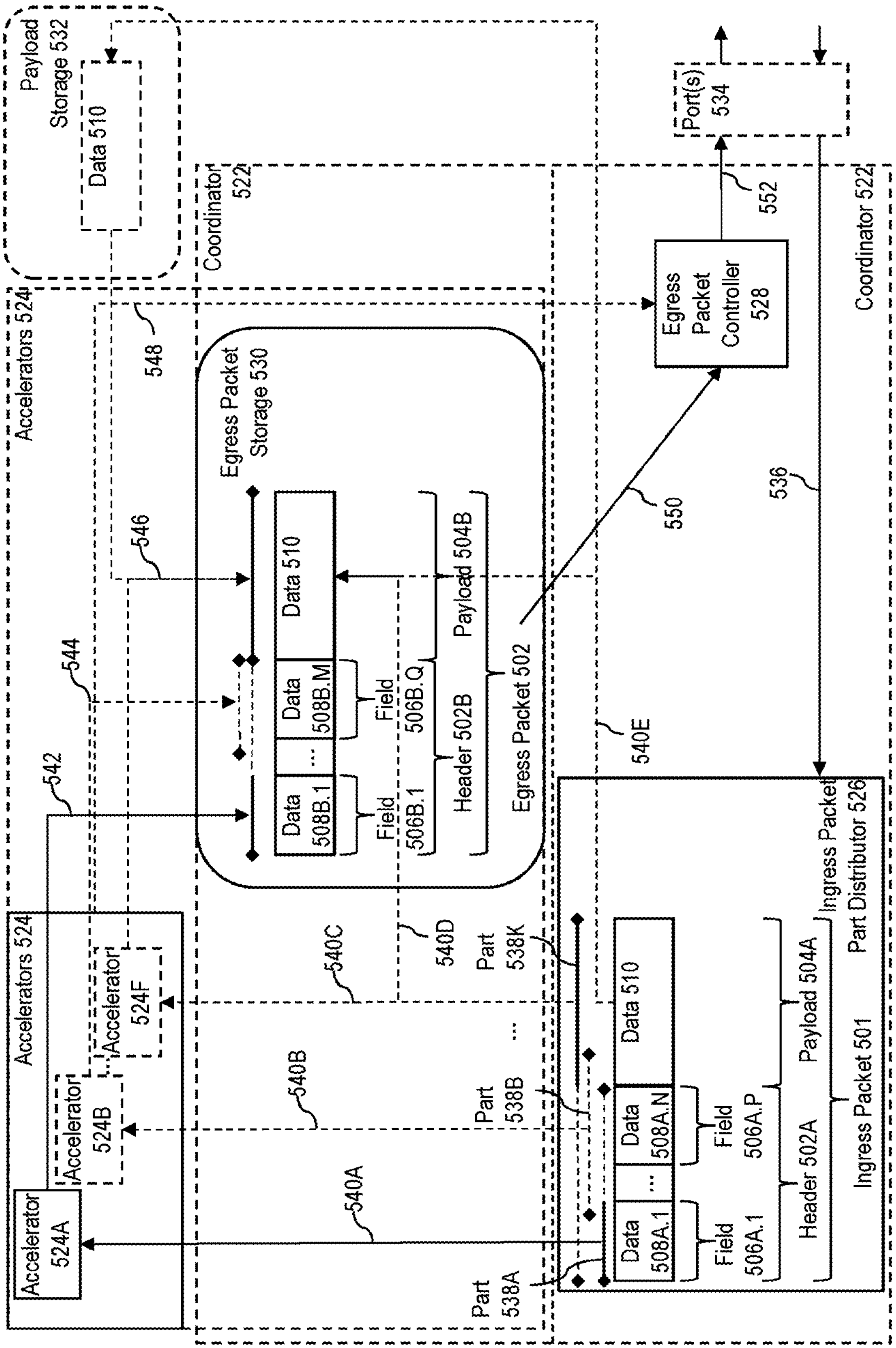
FIG. 5A illustrates various multi-accelerator-based architecture according to various embodiments.

FIG. 5A illustrates various multi-accelerator-based architecture according to various embodiments. The operations of the coordinator 522 include receiving packets, the ingress packet part distributor 526, the egress packet controller 528, and optionally the egress packet storage 530. The accelerators 524 perform network functions (and thus may be referred to as NF accelerators) and optionally the egress packet storage 530. The ingress packet part distributor 526 is implemented on an accelerator that may include the egress packet storage 530 and/or the egress packet controller 528. An arrowed line extends to the optional port(s) 534, and an arrowed line 536 extends from the optional port(s) 534 to the ingress packet part distributor 526.

FIG. 5A shows an ingress packet 501 including: 1) a header 502A having fields 506A.1-506A.P respectively with data 508A.1-508A.N; and 2) a payload 504A with data 510. Parts 538A to 538K represent that different embodiments may split a packet differently (e.g., into 2 or more parts, one or more the parts may or may not overlap with one or more of the other parts, etc.). The egress packet storage 530 shows an egress packet 502 including: 1) a header 502B having fields 506B.1-506B.Q respectively with data 508B.1-508B.N; and 2) a payload 504B with data 510.

Arrowed line 540A represents part 538A (which includes at least a field 506A.1 of the header 502A, and possibly all the header 502A) of the ingress packet 501 going to the accelerator 524A. Arrowed line 542 extends from the accelerator 524A to at least field 506B.1 (and optionally through to field 506B.Q, and thus the entire header 502B) of the egress packet 502 in the egress packet storage 530.

Arrowed line 540B represents that optionally part 538B (which may include some of the header 502A and/or some of the payload 504A) of the ingress packet 501 may optionally go to the optional accelerator 524B. Dashed arrowed line 544 extends from the optional accelerator 524B optionally to field 506B.Q (and optionally additional fields of the header 502B, but not the entire header 502B and not field 506B.1) of the egress packet 502 in the egress packet storage 530.

In different embodiments the payload 504A (which stores data 510) of the ingress packet 501 may travel on different paths from the ingress packet part distributor 526 to the egress packet storage 530. For example, line 540E represents the payload going to the payload storage 532, and then to the egress packet storage 530. In contrast, line 540D represents an alternative in which the payload is sent directly from the ingress packet part distributor 526 to the egress packet storage 530. Line 540C represents that the part 538K (which includes the payload and optionally additional bits) of the ingress packet 501 may additionally or alternatively be sent to an optional accelerator 524F; in which case, the accelerator 524F may write the payload to the egress packet storage 530 (see dashed line 546) and/or control (see dashed line 548) the egress packet controller 528 (e.g., instruct to transmit or drop the packet). A later figure shows an alternative embodiment in which the egress packet storage 530 is part of the accelerator 524F, line 540D represents the payload being written directly to the egress packet storage 530 via RDMA, and line 540C represents, in embodiments that use such a mechanism, the ingress packet part distributor 526 notifying accelerator 524F regarding the writing of the payload. Alternatively, in some embodiments, line 540C represents the part 538K (which includes the payload and optionally additional bits) of the packet being sent to the accelerator 524F, which depending on the embodiment, may: 1) store the payload in the egress packet storage 530 (line 546); and/or 2) and/or control (see line 548) the egress packet controller 528 (e.g., instruct to transmit or drop the packet).

Arrowed line 550 extends from the egress packet 502 to the egress packet controller 528, arrowed line 552 extends from the egress packet controller 528 to optional port(s) 534, and an arrowed line extends from the optional port(s) 534 out.

Figure 5B:
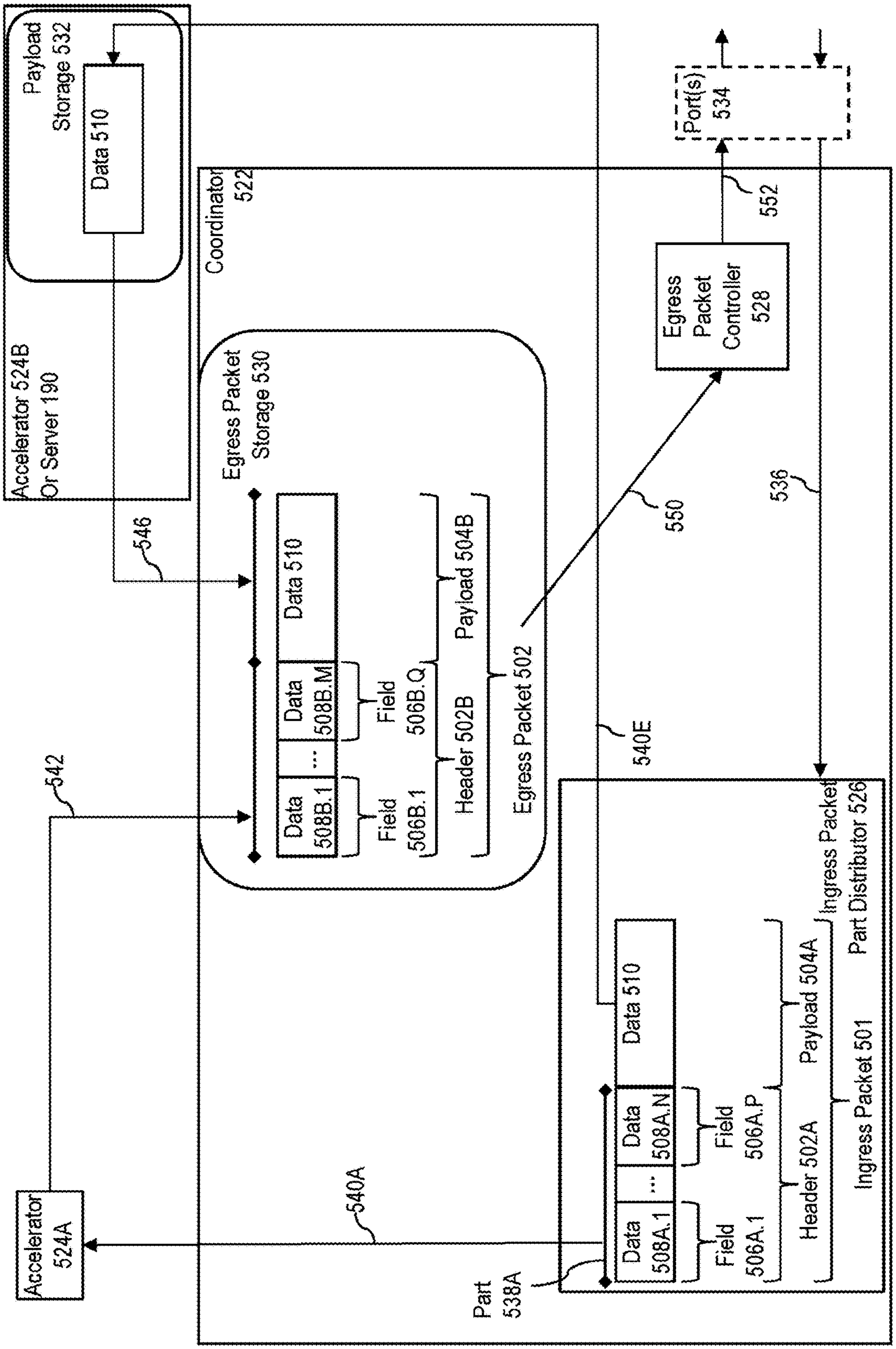
FIG. 5B illustrates a multi-accelerator-based architecture according to some of the embodiments shown in FIG. 5A.

FIG. 5B illustrates a multi-accelerator-based architecture according to some of the embodiments shown in FIG. 5A. The embodiments shown in FIG. 5B are similar to those shown in FIGS. 1 and 2. The operations of the coordinator 522 include receiving packets, the ingress packet part distributor 526, the egress packet controller 528, and the egress packet storage 530. The ingress packet part distributor 526 is implemented on an accelerator that includes the egress packet storage 530 and the egress packet controller 528. An arrowed line extends to the optional port(s) 534, and an arrowed line 536 extends from the optional port(s) 534 to the ingress packet part distributor 526.

Arrowed line 540A represents part 538A (which includes the field 508A.1-506A.N of the header 502A of the ingress packet 501) going to the accelerator 524A. Arrowed line 542 extends from the accelerator 524A to the fields 506B.1 to field 506B.Q, and thus the entire header 502B of the egress packet 502, in the egress packet storage 530.

Arrowed line 540E represents the data 510 in the payload 504A going to the payload storage 532. The accelerator 524B or Server 190 is shown including the payload storage 532. Arrowed line 546 shows data 510 in the payload storage 532 going to the payload 504B of the egress packet 502 in the egress packet storage 530.

Arrowed line 550 extends from the egress packet 502 to the egress packet controller 528, arrowed line 552 extends from the egress packet controller 528 to optional port(s) 534, and an arrowed line extends from the optional port(s) 534 out.

Figure 5C:
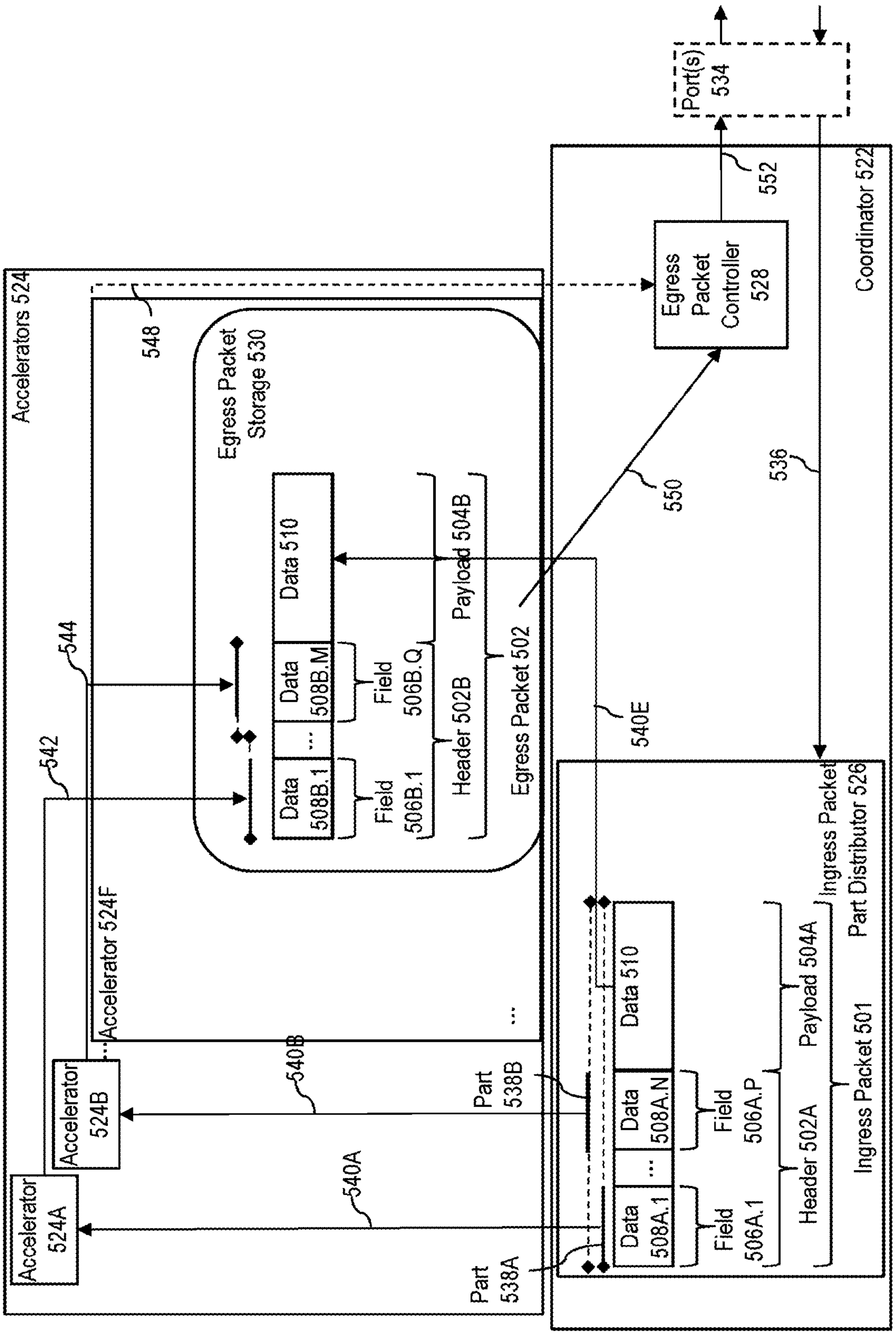
FIG. 5C illustrates a multi-accelerator-based architecture according to some of the embodiments shown in FIG. 5A.

FIG. 5C illustrates a multi-accelerator-based architecture according to some of the embodiments shown in FIG. 5A. In FIG. 5C, different accelerators generate different fields of headers, and accelerator 524F stored the payload and merges the header parts. The operations of the coordinator 522 include receiving packets, the ingress packet part distributor 526, and the egress packet controller 528. The ingress packet part distributor 526 is implemented on an accelerator that includes the egress packet controller 528. An arrowed line extends to the optional port(s) 534, and an arrowed line 536 extends from the optional port(s) 534 to the ingress packet part distributor 526.

Arrowed line 540A represents part 538A (which includes at least the field 508A.1 of the header 502A (and possibly the entire ingress packet 501) going to the accelerator 524A. Arrowed line 542 extends from the accelerator 524A to at least field 506B.1 (and optionally additional fields of the header 502B but not field 506B.Q) of the egress packet 502 in the egress packet storage 530.

Arrowed line 540B represents that part 538B (which includes field 506A.P, and optionally other fields of the header and/or some or all the payload 504A) going to the accelerator 524B. Arrowed line 544 extends from the accelerator 524B to at least field 506B.Q (and optionally additional fields of the header 502B but not the entire header 502B and not field 506B.1) of the egress packet 502 in the egress packet storage 530.

Arrowed line 540E represents data 510 in the payload 504A of the ingress packet 501 going to the payload 504B in the egress packet storage 530. Arrowed line 550 extends from the egress packet 502 to the egress packet controller 528, arrowed line 552 extends from the egress packet controller 528 to optional port(s) 534, and an arrowed line extends from the optional port(s) 534 out.

Figure 5D:
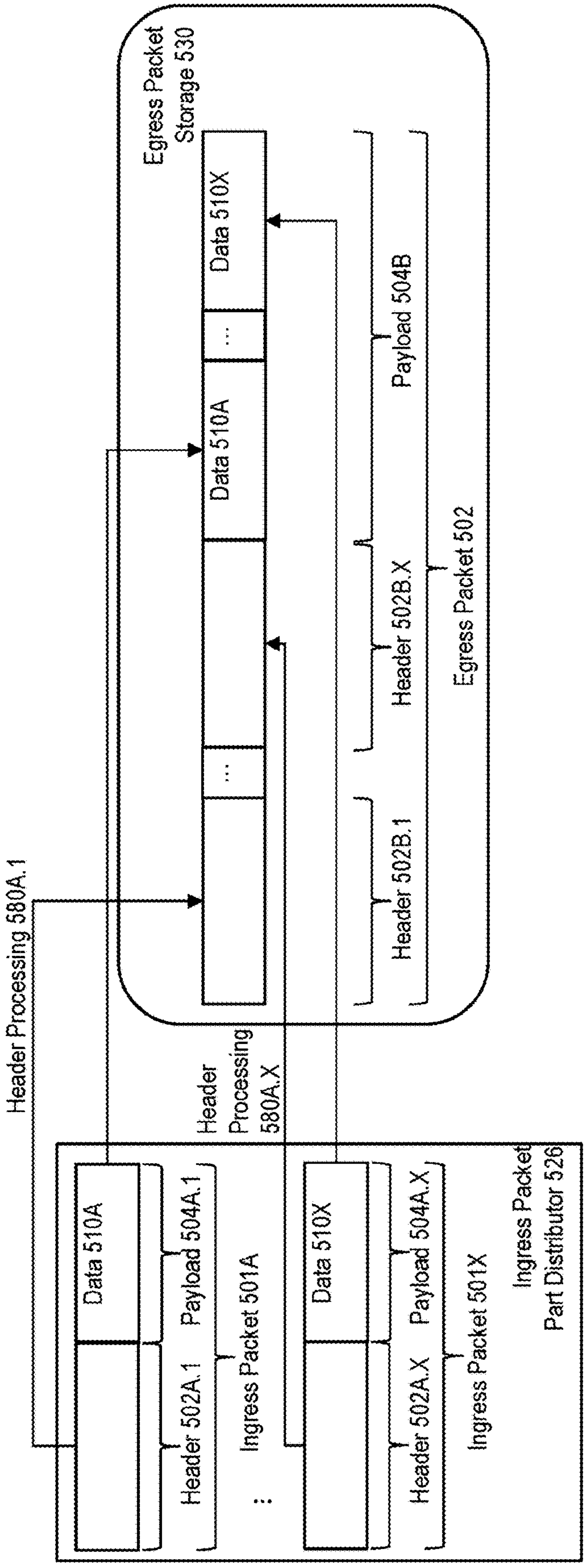
FIG. 5D illustrates the construction of a jumbo packet in the context according to some embodiments.

FIG. 5D illustrates the construction of a jumbo packet according to some embodiments. FIG. 5D, the ingress packet part distributor 526 shows ingress packets 501A to 501X, each of which includes a header and a payload (e.g., packet 501A includes header 502A.1 and payload 504A.1, and the payload 504A.1 stores data 510A; while packet 501X includes header 502A.X and payload 504A.X, and the payload 504A.X stores data 510X).

In FIG. 5D, the egress packet storage 530 shows an egress packet 502 including: 1) headers 502B.1 to 502B.X; and 2) a payload 504B with data 510A to 510X. In FIG. 5D, a " . . . " is shown between: 1) ingress packet 501A and ingress packet 501X; 2) header 502B.1 and header 502B.X of the egress packet 502; and data 510A and data 510X in payload 504B of the egress packet 502.

Arrowed line 580A.1 extends from the header 502A.1 of ingress packet 501A, represents header processing, and points to the header 502B.1 at the start of the egress packet 502. An arrowed line extends from data 510A in payload 504A.1 of ingress packet 501A and points to data 510A in the start of the payload 504B of the egress packet 502.

Arrowed line 580A.X extends from the header 502A.X of ingress packet 501X, represents header processing, and points to the header 502B.X of the egress packet 502 (after the header 502B.1 and the " . . . ", but before the start of the payload 504B of the egress packet 502; the last header in the egress packet 502). An arrowed line extends from data 510X in payload 504A.X of ingress packet 501X and points to data 510X in the payload 504B of the egress packet 502 (after the data 510A and the " . . . "; the last data in the payload 504B).

Figure 5E:
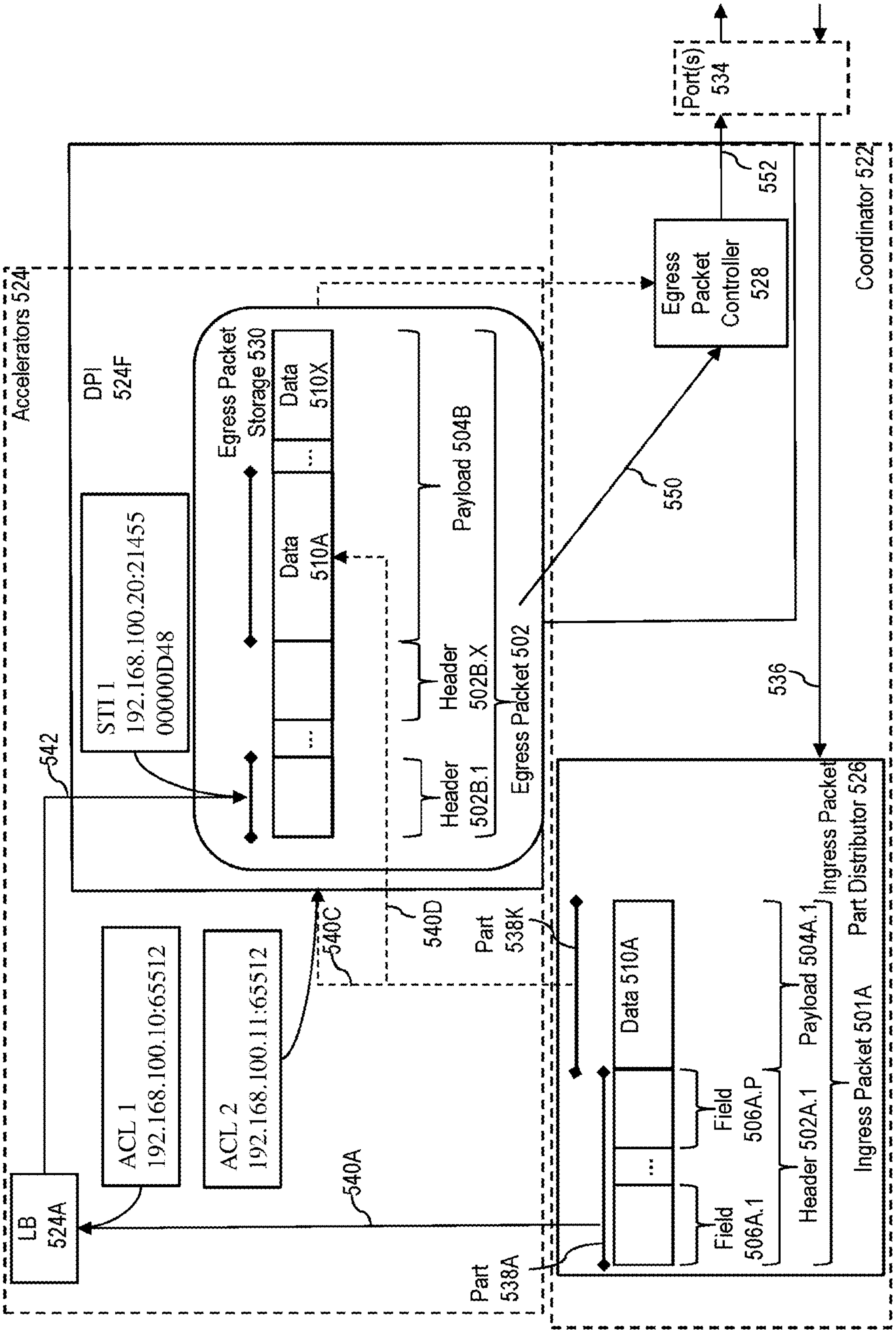
FIG. 5E illustrates a multi-accelerator-based architecture according to some of the embodiments shown in FIG. 5A.

FIG. 5E illustrates a multi-accelerator-based architecture according to some of the embodiments shown in FIG. 5A. In FIG. 5E, the ingress packet part distributor 526 is on a different accelerator than the egress packet controller 528, with both an NF (DPI) and the egress packet controller 528 being implemented on the same accelerator (accelerator 524F); thus, the operations of the accelerator 524F include aspects of the NF accelerators and the coordinator 522 (the egress packet controller 528).

In FIG. 5E, the egress packet storage 530 shows the egress packet 502 including: 1) the headers 502B.1 to 502B.X; and 2) the payload 504B with data 510A to 510X.

Arrowed line 540A represents part 538A (which includes the fields 508A.1-506A.P of the header 502A.1) going to LB 524A (an accelerator operating as a load balancer). The arrowed line 540A is labeled ACL1 192.168.100.10:65512, which indicates that part 538A is sent to accelerator 1 (LB 524A) using that IP address/port (see additional description later herein). Arrowed line 542 extends from the accelerator 524A to the header 502B.1 at the start of the egress packet 502 in the egress packet storage 530 in the DPI 524F. The arrowed line 542 is labeled STI 1 192.168.100.20: 2145500000D48, which indicates the writing of contents into the egress packet storage 530 in the merging server/accelerator (DPI 524F) using that IP address, TCP/UDP port, and segment address (see additional description later herein).

The egress packet storage 530 and the egress packet controller 528 are part of the DPI 524F (an accelerator performing DPI). Arrowed line 540D represents part 538K (which is the data 510A in the payload 504A.1 of the ingress packet) operationally being written directly to the egress packet storage 530 via RDMA (namely, at the start of the payload 504B of the egress packet 502); while line 540C represents, in embodiments that use such a mechanism, the ingress packet part distributor 526 notifying accelerator 524F regarding the writing of the payload. The arrowed line 540C is labeled ACL2 192.168.100.11:65512, which indicates communication is sent to THE merging server/accelerator (DPI 524F) at that IP address/port (see additional description later herein).

Arrowed line 550 extends from the egress packet 502 to the egress packet controller 528, arrowed line 552 extends from the egress packet controller 528 to optional port(s) 534, and an arrowed line extends from the optional port(s) 534 out.

Figure 6:
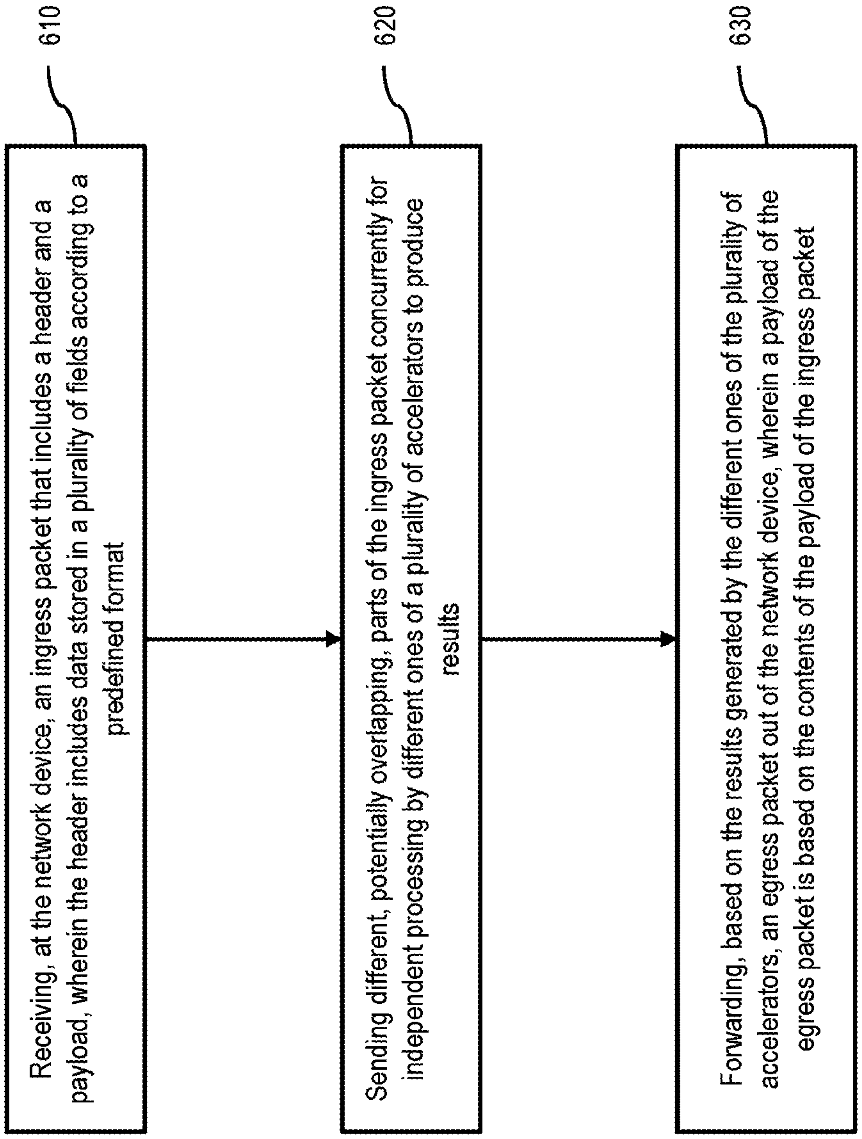
FIG. 6 is a flowchart showing packet processing according to some embodiments.

FIG. 6 is a flowchart showing packet processing according to some embodiments. FIG. 6 shows a method performed in a network device.

At step 610, the network device receives an ingress packet that includes a header and a payload, wherein the header includes data stored in a plurality of fields according to a predefined format.

At step 620, the network device sends different, potentially overlapping, parts of the ingress packet concurrently for independent processing by different ones of a plurality of accelerators to produce results.

At step 630, the network device forwards, based on the results generated by the different ones of the plurality of accelerators, an egress packet out of the network device, wherein a payload of the egress packet is based on the contents of the payload of the ingress packet.

Exemplary Data Structures

In some embodiments, the Packet Slicer uses three data structures (e.g., tables) to (i) configure and manage accelerators and schedule the appropriate network function on the right accelerator; (ii) keep track of the required processing tasks for different traffics (e.g., different flows); and (iii) managing memory and storing the processed slices of the received traffic to merge them and/or construct jumbo frames.

Accelerator Data Structure

This data structure is used to configure/manage accelerators and schedule the right packets on the right accelerator. Table 1 shows an example table for this data structure. As shown, it requires at least four columns/fields as follows:

ID: This column specifies an ID/name/alias for a specific accelerator.

Control Plane Address: This column keeps the IP address/port for configuring the accelerator.

Data Plane Address: This column shows the IP address/port that should be used to send packets for processing.

Note that one accelerator could perform multiple functions, in which case embodiments may use a secondary identifier, such as TCP/UDP port address, to distinguish between different processing tasks. An alternative implementation may have the previous node add a specific header/trailer to the packets to provide information for the processing.

Network Function (processing task): This column specifies the network function(s) or type(s) of processing that will be performed on the received traffic. For instance, it can refer to an NF ID specified in the first column of 'Network Function Data Structure', see Table 2.

TABLE 1

A sample accelerator data structure

| ACL ID | Control plane Address | Data plane Address | Network Function - Processing Task (NF ID) There are generally two different kinds of NFs: (i) stateless NFs (e.g., router, stateless load balancer, simple per-port packet scheduler) and (ii) stateful NFs (e.g., NAT, stateful load balancer, advanced/stateful scheduler like Reframer). Depending on the implementation, DPI can be both stateless or stateful. |
|---|---|---|---|
| ACL1 | 192.168.20.100:5050 | 192.168.100.10:65512 | LB-1 |
| ACL2 | 192.168.20.101:5050 | 192.168.100.11:65512 | DPI-1 |

Network Function Data Structure

This data structure contains the main information used in some embodiments by the Packet Slicer to split packets into multiple parts/slices and schedule those parts on different accelerators. Table 2 shows a sample table for the network function data structure. As shown, this data structure has 6 columns/fields as follows:

NF ID: This column specifies an identifier (e.g., ID or name) for each network function managed by the Packet Slicer.

Required bytes: This column shows the slices/portions of the packet needed by the network function to process the packet. This information is used to split the packets into slices. While some embodiments identify how a packet should be separated into parts via indication of a number of bytes, alternative embodiments do so by fields of the header (in which case the Packet Slicer has a parser to extract the correct fields based on the pre-configured protocol format specifications; the protocol format specification (i.e., the bytes representing/storing different fields) can be stored in a separate data structure or it can be included as part of the software/hardware implementing the Packet Part Distributor).

Preferrable accelerators: This column represents a list of potential accelerators that could perform the network function.

Jumbo frame construction: This field shows whether the packets of the same flow should be ordered and merged as a jumbo frame or not. The value of the column specifies the size of the jumbo frame in bytes. If zero, the packets will not be merged.

Scheduling Policy: This field shows whether the packets of the same flow should be scheduled based on a specific policy. One can see the scheduling policy as a specialized network function that will be configured and deployed in front of the primary network function (e.g., a load balancer). For instance, some packets can be scheduled via ORD policy (reordering policy) where packets are ordered before being transmitted to the end-host servers to improve spatial/temporal locality. Another example is using a packet scheduler called PFAB, similar to pFabric, where packets are prioritized based on how many other packets exist in a flow, i.e., packets closer to the end of the flow are prioritized.

Scheduling Parameter: The value of this column configures the scheduling policy set in the previous column. For example, when the scheduling policy is set to ORD, this column can specify the amount of time (e.g., how many microseconds) that Packet Slicer should wait to receive packets from the same flow before reordering & transmitting them to the servers.

TABLE 2

A sample network function data structure.

| NF ID | Required Bytes | Preferrable Accelerators The packet slicer decides, based on any kind of distribution policy, which of the accelerators to send the part of the packet header to. | Jumbo Frames Construction | Scheduling Policy | Scheduling Parameter |
|---|---|---|---|---|---|
| LB1 | 0-64 | ACL1 | 4096 | — | 25 |
| DPI1 | 64+ | ACL2 | 4096 | — | 25 |

While in some embodiments all incoming packets are processed in the same way, alternative embodiments support, in some cases, having some packets go through a different processing pipeline. To perform flow-aware packet processing, the Network Function Data Structure may be extended to include the flow ID or a packet identifier to specify the applicable traffic.

Merging Data Structure or Trailer Format

This data structure is used to specify the memory location (s) to which a packet part/slice should be stored. In cases where the accelerator cannot directly send the processed packet slice to the specified locations; it can extend the packet with a trailer to delegate the fine-tune placement of the slice to the accelerator that is used for merging (e.g., a server equipped with HBM and/or support RDMA).

Table 4Table 3 and table 4 show a sample merging data structure and packet trailer, respectively. This merging structure assumes that there is a single slice at the beginning of the packet (i.e., the packet is split into a header part and a payload). We believe an expert in the field could extend this data structure to multiple slices. As shown, the packet trailer contains a subset or (mix) of columns that already exist in the merging data structure. In some embodiments, the merging data structure has 6 columns/fields, as follows:

Merger ID: This column shows an identifier for the merging server/accelerator.

Address: This column specifies the IP address and TCP/UDP port used to access the merging server. In some cases, the merging server might have multiple addresses for control & data planes, or different addresses for different channels/nodes of memory to improve performance. Note that in some cases, this field may be specified separately in the 'Accelerator Data Structure', see Table 1.

Segment Address: This column specifies the starting address of a segment to store a packet/slice. The segment size depends on the memory specifications, the minimum supported slice size, and the accelerator configuration. For instance, an example merger can have 64-byte segments, each representing the smallest slice. In a jumbo-frame-enabled case, a segment can contain multiple packets/slices. For example, the segment size can be 4096 bytes, equivalent to the requested jumbo frame size.

Starting Headroom Offset: This column shows the starting index within a segment. This value can be used to define how much space will be needed by the new header, which will be stored right in front of the payload of the packet. The packets are stored in a location calculated based on the segment address and index (e.g., a simple sum operation like address+index), which store the payload of the packet in a memory location that will be adjacent to the location where the new header will be stored. This column is useful in cases where we want to reserve a headroom at the beginning of the segment. Otherwise, this column may not be necessary.

Current Packet Index: This column specifies the current index within the segment. Every time Packet Slicer initiates a merging operation for a packet, it increases this field. For instance, it adds the packet size to the current value of the field. This can be used to store payloads of packets that need to be rebuilt using Jumbo frames in contiguous memory.

Flow ID: This column is used for per-flow memory address tracking, which is used in some embodiments when performing jumbo frame construction. Packet Slicer needs to know how to store the consecutive packets of the flow contiguously in memory to be able to construct jumbo frames efficiently. In non-jumbo-frame scenarios, the different slices/packets of the same flow do not require contiguous memory. Therefore, we do not need to allocate per-flow contiguous memory.

There might be scenarios where the proposed merging data structure may not be enough to manage the memory segments efficiently. An expert in the field can extend the proposed data structure to address this. For instance, the data structure should be able to detect the free locations/segments in the merging servers.

TABLE 3

A sample merging data structure.

| Merger ID | Address | Segment Address | Starting Headroom Offset | Current Packet Index | Flow ID |
|---|---|---|---|---|---|
| ST1 | 192.168.100.20:21455 | 00000CFE | 0 | 74 | FLOW1 |

TABLE 4

A sample trailer format to specify the merging/storage location for a packet slice; note that 0xD48 = 0xCFE + 74.

| Address | Storing Address |
|---|---|
| 192.168.100.20:21455 | 00000D48 |

It is worth mentioning that an alternative implementation of Packet Slicer may merge all the required information into one data structure, or cache/store a subset of them into a separate data structure in order to improve performance.

Execution Example

This example will be explained in three main phases: (a) the initialization phase where the system is initialized and configured to utilize the proposed idea; (b) the packet reception phase where the system performs actual tasks while handling the incoming traffic; and (c) packet transmission phase where the processed slices of the incoming traffic are merged into jumbo frames.

In this example, the Packet Slicer is realized on an ASIC-based switch, and network functions (i.e., a load balancer and a DPI) are performed on CPU-based commodity hardware. Moreover, the merging is done on an RDMA-enabled server where Deep Packet Inspection (DPI) analyzes the payload of the packets while waiting to receive the headers processed by a load balancer run on a different server.

Initialization Phase: AKA (a) Configuring Different Accelerators and Scheduling a Ported Version of Network Functions on them 1. A network administrator/user configures and initializes the Packet Slicer. To do so, they populate data structures, such as the previously described 3 data structures, i.e., (i) accelerator data structure, (ii) network function data structure, and (iii) merging data structure.
2. Based on the received information, Packet Slicer (i) opens connections between the different accelerators,
   (ii) configures the accelerators,
   (iii) deploys the relevant network functions, and
   (iv) initializes the slicing/merger platforms that can be realized as part of Packet Slicer.

This step can benefit from an advanced compiler/scheduler (e.g., Clara and Gallium) to port the network function to a specific accelerator and/or optimize their performance.

In the example, the programmable switch opens connections to the two CPU-based accelerators, i.e., a server running a load balancer function and an RDMA-enabled server storing the packet payloads & running DPI on them. Additionally, Packet Slicer deploys the right network functions on the mentioned accelerators and initializes the slicing/merging facilities accordingly.

In the example, the network administrator has asked for jumbo frame constructions with 4096-byte frames and additional parameters of 25, which specifies the maximum waiting time before transmitting a frame. Therefore, Packet Slicer deploys an extra network function after the load balancer to perform packet reordering up to 25 microseconds or up to the accumulation of 4096-byte frames, i.e., it waits up to 25 microseconds to receive another slice of a new packet from the same flow (or to receive multiple packets before the accumulated size of the packet header and received payloads exceed 4096 bytes). It then performs header compaction (i.e., computing a single header for the larger merged payloads) and finally transmits a single updated header to the specified merging server. This server will ultimately create the Jumbo frame by combining the received single header and payloads.

Packet Reception

1. Packet Slicer receives a packet.

In the example, the Packet Slicer receives a 1024-byte TCP packet with SRC IP address A, DST IP address B, SRC TCP port P1, and DST TCP port P2. Note that IP address B and port P2 specify the virtual address of the load balancer. As the user has asked for jumbo frame construction, Packet Slicer populates the 'merging data structure' with the flow ID (e.g., a hash of five tuples) to be able to store the packet payloads contiguously. If the flow ID exists, Packet Slicer increases the 'current packet index' field with the size of the header and/or payload of the received packet. Note that when jumbo-frame construction is enabled, the Packet Slicer reserves space for only one compacted packet header, and then increases the counter for the payload size. Otherwise, it adds a new entry into the 'merging data structure' with information about the new segment address and variables needed to keep track of the per-flow merging information.

2. Packet Slicer splits the packet based on the pre-defined configurations into multiple slices, and decides where to send each slice for further processing. In some cases, some slices of the packets will be sent to the merger accelerators that can be implemented as part of the Packet Slicer.

In the example, the Packet Slicer splits the incoming packet into two slices: (i) header slice (0-64 bytes) and (ii) payload slice (65-1024 bytes), based on the information available in the data structure.

While this example assumes there are only two contiguous slices, embodiments are not limited to this and it is possible to have more non-contiguous slices. Performing non-contiguous slicing requires some additional information to perform the merging operation appropriately.

3. In some embodiments, the Packet Slicer/Coordinator may send a part of a packet directly via RDMA to its final location (e.g., storage or merging server). However, when needed, the Packet Slicer extends each slice with additional information (e.g., a trailer). For instance, this additional information may be used to instruct an accelerator, which is being assigned to process a packet part, where to store the result of its processing on that part (e.g., the location in the memory of the merging server). As another example, this additional information may indicate where the part is stored (e.g., if RDMA is used to send the part to the accelerator) and/or where to store the part for processing. Such additional information may additionally or alternatively be used for jumbo frame construction. In some cases, Packet Slicer may attach multiple trailers to the packet slices to enable the next accelerators to send them to the right location.

In the example, the Packet Slicer extends the packets with the memory address associated with the received flow. Since the network administrator has asked for jumbo frame constructions, Packet Slicer extends the header slice of all consecutive packets that belong to the same flow with the same trailer, as they will be combined.

4. Packet Slicer sends each slice to its designated processing accelerator. Some processing can also be offloaded to the Packet Slicer itself.

In our example, Packet Slicer sends the packet header to ACL1, and the packet payloads to ACL2.

5. After the processing is done, the accelerators send the slices directly to the merging servers based on the appended information delivered with the slices.

In the example, the load balancer transmits the processed/combined packet header to the right memory address of the merging server. We assume the track keeping for jumbo frame construction is also done by the load balancer; however, it can be deployed as a separate NF on a different accelerator.

Packet Transmission Phase at Merging Servers

In cases where a network function requires advanced scheduling policies, the scheduling may be performed on an intermediate node between the merging servers and the accelerators, and/or done directly on the merging servers. In the latter case, the merging server may be equipped with additional processing power to be able to perform minimal processing tasks. In our example, we assume we need an additional network function for reordering packets due to jumbo frame reconstruction, which has been deployed on the CPU-based accelerator running the load balancer.

1. In the example described here, the results of the accelerator's processing are written via RDMA to the merging server. In embodiments with an accelerator that does not write its results via RDMA, the merging servers receive a packet slice appended with the above discussed additional information (e.g., a trailer).
2. If the above discussed additional information (e.g., the trailer) is to be used by the merging server, the merging server parses the attached trailer in order to store the packet in the right memory locations. In some cases, the previous node/accelerator can perform the parsing and/or use a specific means (e.g., RDMA) to send the packet to the specified locations. In our example, the merging server is RDMA-enabled, and the previous accelerators can directly transmit the packet slices to the right locations.
3. The processed packets will then be delivered to the end-host servers. The merging server sends out the frames as soon as it detects a complete/contiguous frame containing both packet header and packet payload slices. The detection can be performed directly by the merging server, or by a node (e.g., the coordinator) performing additional reordering for the jumbo frame construction or additional scheduling.

In the current example, the reordering network function sends a special message to the merging server that triggers the packet transmission. The trigger can be done directly on the NIC thanks to new technologies such as RedN that make RDMA programmable. In our example, the merging server performs a DPI function on the stored payloads; therefore, the jumbo frames should not be transmitted before the completion of the network functions.

Exemplary Applications Receiving Overlapping Slices and Modifying the Payload The previous example shows a scenario where the ingress packets are split into two non-overlapping parts (i.e., header and payload) and each slice is processed independently. However, in some embodiments different accelerators may receive overlapping parts of the packet. For example, embodiments may have a load balancer and a TCP optimizer as NFs, where the load balancer only receives the 5-tuple (e.g., source & destination IP and source & destination TCP ports), whereas the TCP optimizer receives the 5-tuple plus the TCP options. For example, see FIG. 5C.

The previous example only modified the size of the payload (i.e., the jumbo frame construction concatenates multiple payloads from packets of the same flow), not their content. However, another example scenario may deploy modifying applications/NFs on some accelerators, which could partially or entirely change the content of the payload. For example, a key-value storage may process the GET request and reply with the VALUE and put it in the payload. One may consider the application headers either as part of the packet header or parts of the payload of a packet. For instance, some embodiments consider Layer-7 headers to be part of the payload. Another example is HTTP cache proxies, which may reply to a request with the cached object (so replacing the payload). Additionally, there are more NF examples, such as data redundancy elimination (DRE), which replace only some parts of the payloads.

Exemplary Implementation on a Programmable Switch

In some embodiments, the Packet Slicer is implemented on a programmable switch that has limitations with regard to executable actions and memory. More specifically, the switch does not allow the implementation of advanced packet schedulers and network functions entirely in the data plane of the switch. A requirement for these types of network functions and schedulers is that packets are buffered for a limited amount of time while the packet processing logic determines when the packet should be sent out and how its headers should be modified.

Slicing a Packet

The programmable parser of the switch is responsible for extracting the relevant slices from the packets. Programmable parsers can only inspect the first portion of a packet, which means that the slices must today be limited to the first portions of a packet (which is the case for most NFs). The different slices are sent by the switch to the corresponding NFs. If RDMA is enabled, then the programmable switch can write directly into the memory of the corresponding NFs (accelerators); if not, the programmable switch adds a trailer and transmits it to the corresponding NF. If a slice needs to be transmitted to multiple accelerators, the programmable switch may attach the trailer even when RDMA is enabled, as the first NF (accelerator) receiving the packet uses the additional information to transmit the packet to the second NF or accelerator. Regardless, on each slice, the programmable switch adds the merging accelerator memory location where the corresponding NF (accelerator) is to store the result of the NF's processing. This memory location information is calculated as explained in the merging data structure section.

Storing Payloads on External Memory

The programmable switch implements the necessary logic to store the payloads on external memory. For instance, it is possible to implement RDMA on a programmable switch to directly store the payloads on external RAM memory. Depending on whether Jumbo frame construction is enabled or not, the programmable switch may use different data structures.

Without Jumbo frames. If Jumbo frames are not enabled, then the programmable switch implements the merging data structures explained in Table 3 (without the Flow ID column) within register array data structures. Registers are data structures that can be read and written directly in the data plane (accessed using an index) and allow to realize the update of the "current index" directly in the data plane.

With Jumbo frames. If Jumbo frames are enabled, then the programmable switch implements the data structure of Table 3 with the FlowID field. This is a more complex operation as a simple register array may not be suitable to support this data structure. One reason is that a register array is accessed using an index, but the Flow ID may contain more than 64 bits, requiring the array to be so large that it may not fit on the switch memory. Future generations of programmable switches may address these problems.

In this example implementation, a set of register arrays is used to store the entries of Table 3 where (i) the index of an entry is computed using the hash of the Flow ID and (ii) each column is mapped to a register array. The unavoidable collisions are handled by reconstructing Jumbo frames whenever the Flow ID stored in the register array is identical to one of the incoming packets. Other packets are processed without building Jumbo frames. An additional ByteCount column is added to Table 3 to count how many payloads of a specific flow have already been stored in the external memory. When ByteCount goes above a pre-defined threshold, the programmable switch reads all the externally stored payloads through a single RDMA Read Request. The ByteCount is reset to zero and the corresponding entry is removed from all registers so that a new Flow ID can be stored.

Packet Example with Jumbo Frames.

1. A packet with Flow ID FID arrives at the switch.
2. The programmable parser extracts the relevant slices from the packet header. For example, it may extract the packet 5-tuple that will be sent to a load balancer and the 5-tuple plus the TCP options to a TCP optimization NF. Note that, in this example, different overlapping parts of the received packet are sent to different accelerators.
3. The programmable logic computes the hash of FID and uses it to compute the index IDX where information about FID may potentially be stored. The programmable logic accesses all the register arrays at index IDX to check whether the Flow ID stored in that index is identical to one of the incoming packets. Two cases are possible:
   a. If this is the case, it means that the packet payload may be used to create a Jumbo frame. The switch sets a metadata field JumboMeta to 1 in this case. The computation of where the packet should be stored is performed so that all payloads of this flow will be stored in contiguous locations of memory.
   b. If this is not the case, it means the packet will not be merged with other payloads. The switch sets a metadata field JumboMeta to 0 in this case. In this case, the packet will be stored in the next available memory location.
4. The programmable logic now sends the packet or payload to the external memory and sends the different slices to the external NFs. Each slice contains information about where the output of the NF should be stored on the external memory and whether there are dependencies with other NFs. We do not describe how this check is performed and we claim that an expert in the field would be able to come up with a solution.
5. The programmable switch
   a. receives back a slice from an NF and forwards it to the external memory. (The merger server is a central place to collect the processed header parts. Some accelerators may just give a green light (e.g., control/indication that the processed part of packet header has been provided).
   b. If an accelerator writes a part of a packet header, the accelerator writes/owns that part of the packet header; another accelerator will not write to that same part of the packet header. Put another way, the processed parts of the packet header generated by the different accelerators will not overlap.
   c. If the slice is the last missing one, the switch will trigger the reconstruction of the packet in the case this packet should not become a Jumbo frame or this packet is the last packet that can be fit into a Jumbo frame. In this latter case, the switch will issue both an RDMA Write and Read request (using RDAN technology) to store the last slice and retrieve the entire Jumbo frame. Note that one of the external NFs computes the correct Jumbo frame header (e.g., TCP or UDP checksum).
6. The external memory returns a packet or a Jumbo frame. If the packet is a Jumbo frame, the switch will remove the corresponding existing entry from the register arrays so that the switch will be able to create Jumbo frames for the subsequent arriving packets that would collide with this entry.
7. The programmable switch forwards the packet to the next hop in the network.

Electronic Device and Machine-Readable Medium

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

Network Device

A network device (ND) is an electronic device that communicatively interconnects other electronic devices on the network (e.g., other network devices, end-user devices).

Alternative Embodiments

The operations in the flow diagrams (if any) are described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

While the flow diagrams (if any) in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Exemplary Methods

A method in a network device, the method comprising:

receiving, at the network device, an ingress packet that includes a header and a payload, wherein the header includes data stored in a plurality of fields according to a predefined format;

sending different, potentially overlapping, parts of the ingress packet concurrently for independent processing by different ones of a plurality of accelerators to produce results; and forwarding, based on the results generated by the different ones of the plurality of accelerators, an egress packet out of the network device, wherein a payload of the egress packet is based on the contents of the payload of the ingress packet.

The method wherein at least one of a plurality of fields of a header of the egress packet has stored therein one of the results generated one of the plurality of accelerators.

The method wherein different, non-overlapping ones of the plurality of fields of the header of the egress packet have stored therein different ones of the results generated by different ones of the plurality of accelerators.

The method wherein the sending comprises sending the contents of the payload of the ingress packet to storage.

The method wherein the different, potentially overlapping, parts of the ingress packet include a first part and a second part that respectively include a first subset and a second subset of the data stored in the plurality of fields of the header, wherein the first subset includes at least some of the data stored in the plurality of fields of the header that is not included in the second subset.

The method wherein the sending comprises:

sending first additional information along with a first of the parts to a first of the plurality of accelerators, wherein the first additional information is configured to enable the first of the plurality of accelerators to determine a first memory location at which the result of processing the first part is to be stored; and sending second additional information along with a second of the parts to a first of the plurality of accelerators, wherein the second additional information is configured to enable the second of the plurality of accelerators to determine a second memory location at which the result of processing the second part is to be stored, wherein the first memory location and the second memory location are configured to enable generation of the egress packet including the results of processing the first part and the second part.

The method wherein the payload of the egress packet is different from the payload of the ingress packet.

The method wherein the payload of the egress packet is data retrieved responsive performing a lookup in a data structure based on at least part of the contents of the ingress packet.

A second method in a network device, the method comprising:

receiving, at the network device, ingress packets that include headers and payloads, wherein the headers of the ingress packets include data stored in fields according to a set of one or more predefined formats;

sending different, potentially overlapping, parts of respective ones of the ingress packets concurrently for independent processing by different ones of a plurality of accelerators to produce results for the respective ones of the ingress packets; and forwarding, based on the results generated by the different ones of the plurality of accelerators, egress packets out of the network device, wherein the egress packets include a header with at least a field, wherein the field of the header of respective ones the egress packets have stored therein respective ones of the results generated by one of the plurality of accelerators that processed respective ones of the ingress packets, wherein a payload of respective ones of the egress packets is based on contents of the payload of respective ones of the ingress packet.

The second method wherein the header of the egress packets includes at least a second field, wherein the second field of the header of respective ones the egress packets have stored therein respective ones of the results generated by another of the plurality of accelerators that operated on respective ones of the ingress packets.

What is claimed is:

1. A network device comprising:

a port to receive ingress packets that include headers and payloads, wherein the header includes data stored in a plurality of fields according to a predefined format;

an ASIC-based switch including an ingress packet part distributor to send different, potentially overlapping, parts of respective ones of the ingress packets for independent processing by different ones of a plurality of accelerators to produce results for the respective ones of the ingress packets;

an egress packet controller to forward, based on the results generated by the different ones of the plurality of accelerators, egress packets out of the network device, wherein the payloads of the egress packets are based on the contents of the payloads of the ingress packets;

a first accelerator of the plurality of accelerators to process one of the parts of respective ones of the ingress packets to produce contents for a header field of different ones of the egress packets, wherein the first accelerator operates as a load balancer; and a second of the plurality of accelerators that is a CPU-based accelerator that operates as an RDMA-enabled server storing the payloads of the ingress packets and performing deep packet inspection on those payloads.

2. The network device of claim 1 further comprising:

an egress packet storage, coupled to the first accelerator and the egress packet controller, to store the egress packets.

3. The network device of claim 2, wherein the egress packet controller and the egress packet storage are implemented on the second accelerator.

4. The network device of claim 1, wherein at least one of the egress packets is a jumbo packet that includes a header with a plurality of fields, wherein respective ones of the plurality of fields have stored therein respective ones of the results generated by the first accelerators processing a plurality of the ingress packets, wherein the payload of the egress packet is based on contents of the payloads of the plurality of the ingress packets.

5. The network device of claim 1, wherein different, non-overlapping ones of the plurality of fields of the headers of the egress packets have stored therein different ones of the results generated by different ones of the plurality of accelerators.

6. The network device of claim 1, wherein the ingress packet part distributor sends the headers and the payloads as the parts of the ingress packets respectively to a first and a second of the plurality of accelerators.

7. The network device of claim 6, wherein the ingress packet part distributor extends the headers with additional information that instructs the first of the plurality of accelerators where to store the results of its processing in a memory of the second of the plurality of accelerators.

8. The network device of claim 7, further comprising the first of the plurality of accelerators storing via RDMA the results of its processing in the memory as the headers of the egress packets.

9. The network device of claim 8, wherein the first of the plurality of accelerators sends messages to the second of the plurality of accelerators to trigger the forwarding of respective ones of the egress packets.

10. The network device of claim 1, wherein the different, potentially overlapping, parts of the ingress packets include a first part and a second part that respectively include a first subset and a second subset of the data stored in the plurality of fields of the respective headers, wherein the first and second subsets do not fully overlap.

11. The network device of claim 1, wherein the ingress packet part distributor sends first additional information to a first of the plurality of accelerators, wherein the first additional information is configured to enable the first of the plurality of accelerators to determine first memory locations at which the results of processing the first parts are to be stored, and the ingress packet part distributor sends second additional information to a second of the plurality of accelerators, wherein the second additional information is configured to enable the second of the plurality of accelerators to determine second memory locations at which the results of processing the second parts are to be stored, wherein the first memory locations and the second memory locations are configured to enable generation of the egress packets including the results of processing the first parts and the second parts.

12. A network device comprising:

a port to receive ingress packets that include headers and payloads, wherein the header includes data stored in a plurality of fields according to a predefined format;

an ASIC-based switch including an ingress packet part distributor to send different, potentially overlapping, parts of respective ones of the ingress packets for independent processing by different ones of a plurality of accelerators to produce results for the respective ones of the ingress packets, wherein the ingress packet part distributor sends the headers and the payloads as the parts of the ingress packets respectively to a first and a second of the plurality of accelerators, and wherein the ingress packet part distributor extends the headers with additional information that instructs the first of the plurality of accelerators where to store the results of its processing in a memory of the second of the plurality of accelerators;

the first of the plurality of accelerators storing via RDMA the results of its processing in the memory as the headers of the egress packets, wherein the first of the plurality of accelerators sends messages to the second of the plurality of accelerators to trigger the forwarding of respective ones of the egress packets; and an egress packet controller to forward, based on the results generated by the different ones of the plurality of accelerators, egress packets out of the network device, wherein the payloads of the egress packets are based on the contents of the payloads of the ingress packets.

13. The network device of claim 12 further comprising:

an egress packet storage, coupled to the first of the plurality of accelerators and the egress packet controller, to store the egress packets.

14. The network device of claim 12, wherein the egress packet controller and an egress packet storage are implemented on the second of the plurality of accelerators.

15. The network device of claim 12, wherein at least one of the egress packets is a jumbo packet that includes a header with a plurality of fields, wherein respective ones of the plurality of fields have stored therein respective ones of the results generated by the first of the plurality of accelerators processing a plurality of the ingress packets, wherein the payload of the egress packet is based on contents of the payloads of the plurality of the ingress packets.

16. The network device of claim 12, wherein different, non-overlapping ones of the plurality of fields of the headers of the egress packets have stored therein different ones of the results generated by different ones of the plurality of accelerators.

17. The network device of claim 12, wherein the different, potentially overlapping, parts of the ingress packets include a first part and a second part that respectively include a first subset and a second subset of the data stored in the plurality of fields of the respective headers, wherein the first and second subsets do not fully overlap.

* * * * *